US006456826B1

(12) United States Patent
Toskala et al.

(10) Patent No.: US 6,456,826 B1
(45) Date of Patent: Sep. 24, 2002

(54) USER EQUIPMENT AND PROCEDURE FOR HANDLING POSSIBLE OUT-OF-SYNCHRONIZATION CONDITION IN UMTS TERRESTRIAL RADIO ACCESS NETWORK FOR TIME DIVISION DUPLEXING MODE

(75) Inventors: Antti Toskala, Helsinki; Mirko Aksentijevic, Espoo, both of (FI)

(73) Assignee: Nokia Mobile Phones Ltd. (FI)

( * ) Notice: Subject to any disclaimer, the term of this patent is extended or adjusted under 35 U.S.C. 154(b) by 0 days.

(21) Appl. No.: 09/513,417

(22) Filed: Feb. 25, 2000

(51) Int. Cl.[7] .............................................. H04B 15/00
(52) U.S. Cl. .......................... 455/63; 455/69; 455/522; 370/350; 375/356
(58) Field of Search .......................... 455/63, 69, 522, 455/502; 370/350, 337; 375/356, 357, 368

(56) References Cited

U.S. PATENT DOCUMENTS

| 5,008,953 A | 4/1991 | Dahlin et al. |
| 5,375,253 A | 12/1994 | Lopponen |
| 5,959,983 A | * 9/1999 | Saito et al. ................. 370/337 |

FOREIGN PATENT DOCUMENTS

| EP | 0936831 | 8/1999 |
| WO | 9953701 | 10/1999 |

OTHER PUBLICATIONS

"Power Control Requirements in Linear Decorrelating Detectors for CDMA" by F.C. Zheng et al, IEEE Vehicular Technology Conference, vol. 1, May 4–7, 1997, pp. 213–217.

3G TS 25.401 v1.0.0 (1999–04), 3rd Generation Partnership Project (3GPP); Technical Specification Group (TSG –RAN); UTRAN Overall Description.

3G TS 25.402 v3.0.0 (2000–01), 3rd Generation Partnership Project (3GPP); Technical Specification Group Radio Access Network; Synchronization in UTRAN Stage 2 (3G TS 25.402 v 3.0.0 Release 1999).

* cited by examiner

*Primary Examiner*—Lee Nguyen
(74) *Attorney, Agent, or Firm*—Ware, Fressola, Van Der Sluys & Adolphson LLP (57) ABSTRACT

An out-of-synchronization condition for a Universal Mobile Telecommunications System (UMTS) is defined for a situation in which it may be difficult to distinguish an out-of-synchronization condition in a downlink dedicated channel from interference on that channel. A request is sent on an uplink from a user equipment (UE) to a base station transceiver (BST) for increased power on a downlink channel experiencing a possible frames out-of-synchronization condition, which may instead be a possible interference condition, so as to attempt to eliminate the possible interference. After a first selected period of time without eliminating the possible interference problem, the uplink is terminated unless a broadcast downlink channel is determined to be experiencing interference below a selected level, in which case the UE is allowed to continue to send the request for increased power. Only after a second selected period of time without eliminating the possible interference problem is the uplink terminated.

26 Claims, 7 Drawing Sheets

USER EQUIPMENT AND PROCEDURE FOR HANDLING POSSIBLE OUT-OF-SYNCHRONIZATION CONDITION IN UMTS TERRESTRIAL RADIO ACCESS NETWORK FOR TIME DIVISION DUPLEXING MODE

BACKGROUND OF THE INVENTION

1. Technical Field

This invention relates to mobile telecommunications and, more particularly, to defining how to handle an out-of-synchronization condition for UMTS where it may be difficult to distinguish an out-of-synchronization condition in a downlink dedicated channel from interference in that channel.

2. Discussion of Related Art

Currently in the development of the Universal Mobile Telecommunications System (UMTS), there is no procedure defined on how the user equipment (UE) is supposed to handle an out-of-synchronization condition when it occurs. The synchronization model for UMTS is shown in the 3GPP Technical specification TS 25.401v1.0.0 (1999-04) "UTRAN Overall Description", at pp. 19–27. Further details can be found in the 3GPP Technical Specification TS 25.402v3.0.0 (2000-01) "Synchronization in UTRAN Stage 2", and in other documents cross-referenced therein.

A generic solution that has been applied, for example, in IS-95, could be considered, based on the cyclic redundancy code (CRC) check results. With the IS-95 solution, time division duplex (TDD) specific issues are not taken into account, and the DTX (battery saving feature on a cellular phone that cuts back the output power when the speaker stops speaking) structure with UTRAN (UMTS Terrestrial Radio Access Network) TDD does not provide the CRC check in every frame, as in IS-95.

There is therefore a need to define how to handle an out-of-synchronization condition for UMTS.

DISCLOSURE OF INVENTION

It is an object of the present invention to define how to handle an out-of-synchronization condition for UMTS.

According to a first aspect of the invention, a method for use by user equipment in a mobile telecommunications system comprises the steps of sending a request on an uplink from a UE to a base station transceiver for increased power on a downlink channel experiencing a possible frames out-of-synchronization condition which may instead be a possible interference condition so as to attempt to eliminate said possible interference condition by increased power, and terminating said uplink after a first selected period of time without eliminating said possible interference problem unless a broadcast downlink channel is determined to be experiencing interference below a selected level in which case said UE continues to send said requests for increased power until after a second selected period of time without eliminating said possible interference problem after which said uplink is terminated.

According to a second aspect of the invention, a method for use by user equipment in a mobile telecommunications system comprises the steps of sensing in each UE a parameter having a magnitude indicative of a possible out-of-synchronization condition of each frame of a radio downlink channel from a base station transceiver to the UE, for providing a sensed signal have a magnitude indicative thereof, comparing said sensed signal to a threshold for providing a possible frame out-of-sync signal for each frame for which said sensed signal exceeds said threshold, signaling on a radio uplink from the mobile station to the BST, in response to said frame out-of-sync signal, a signal request for increased power on said radio downlink, incrementing, in response to each frame out-of-sync signal, a counter of possible frame out-of-sync signals, for providing a count signal indicative of a number of frames possibly out-of-synchronization, and comparing said count signal to a count threshold for providing an uplink shutdown signal in the presence of said count signal equalling or exceeding said count threshold.

Further according to the second aspect of the invention, the method further comprises the steps of delaying said providing said uplink shutdown signal in the presence of a downlink broadcast channel that is functioning with interference at an acceptable level and continuing said signaling on said radio uplink from the UE to the BST for increased power on said radio downlink, said incrementing said counter, and said comparing said count signal but now to a selected increased count threshold for providing said uplink shutdown signal in the presence of said count signal equalling or exceeding said selected increased count threshold.

According to a third aspect of the invention, a method for use in a mobile telecommunications system having plural cells, each cell having a base station transceiver for communicating over multiple radio links at the same time with corresponding multiple mobile stations in the cell and over additional radio links with corresponding additional UEs nearby but in other cells, comprises the steps of sensing in each UE a parameter having a magnitude indicative of a possible out-of-synchronization condition of each frame of a radio downlink channel from the BST to the UE, for providing a sensed signal having a magnitude indicative thereof, comparing said sensed signal to a threshold, for providing a possible frame out-of-sync signal for each frame for which said sensed signal exceeds said threshold, determining if a downlink broadcast channel is functioning properly for providing a broadcast channel health signal, providing an uplink shutdown signal to said BTS from said UE in the absence of said BCCH health signal and otherwise, signaling on a radio uplink from the UE to the BST, in response to both said BCCH health signal and said frame out-of-sync signal, a signal request for increased power on said radio downlink, incrementing in response to each frame out-of-sync signal, a counter of possible frame out-of-sync signals, for providing a count signal indicative of a number of frames possibly out-of-synchronization, and comparing said count signal to a count threshold for providing said uplink shutdown signal in the presence of said count signal equalling or exceeding said count threshold regardless of the presence or absence of said BCCH health signal.

According to a fourth aspect of the invention, user equipment for use in a mobile telecommunications system comprises means for sending a request on an uplink from said UE to a base station transceiver for increased power on a downlink channel experiencing a possible frames out-of-synchronization condition which may instead be a possible interference condition so as to attempt to eliminate said possible interference condition by increased power, and means for terminating said uplink after a first selected period of time without eliminating said possible interference problem unless a broadcast downlink channel is determined to be experiencing interference below a selected level in which case said UE continues to send said requests for increased power until after a second selected period of time without eliminating said possible interference problem after which said uplink is terminated.

According to a fifth aspect of the invention, user equipment for use in a mobile telecommunications system comprises means for sensing in each UE a parameter having a magnitude indicative of a possible out-of-synchronization condition of each frame of a radio downlink channel from a base station transceiver to the UE, for providing a sensed signal have a magnitude indicative thereof, means for comparing said sensed signal to a threshold for providing a possible frame out-of-sync signal for each frame for which said sensed signal exceeds said threshold, means for signaling on a radio uplink from the UE to the BST, in response to said frame out-of-sync signal, a signal (TPC) request for increased power on said radio downlink, means for providing, in response to each possible frame out-of-sync signal, a count signal indicative of a number of frames possibly out-of-synchronization, and means for comparing said count signal to a count threshold for providing an uplink shutdown signal in the presence of said count signal equaling or exceeding said count threshold.

In further accord with the fifth aspect of the invention, the user equipment further comprises means for delaying said providing said uplink shutdown signal in the presence of a downlink broadcast channel that is functioning with interference at an acceptable level whereby said signaling on said radio uplink from the UE to the BST for increased power on said radio downlink is continued for a selected period.

According to a sixth aspect of the invention, an apparatus for use in a mobile telecommunications system having plural cells, each cell having a base station transceiver for communicating over multiple radio links at the same time with corresponding multiple mobile stations in the cell and over additional radio links with corresponding additional UEs nearby but in other cells, comprises means for sensing in each UE a parameter having a magnitude indicative of a possible out-of-synchronization condition of each frame of a radio downlink channel from the BST to the UE, for providing a sensed signal having a magnitude indicative thereof, means for comparing said sensed signal to a threshold, for providing a possible frame out-of-sync signal for each frame for which said sensed signal exceeds said threshold, means for determining if a downlink broadcast channel is functioning properly for providing a broadcast channel health signal, means for providing an uplink shutdown signal to said BTS from said UE in the absence of said BCCH health signal, means for signaling on a radio uplink from the UE to the BST, in response to both said BCCH health signal and said frame out-of-sync signal, a signal request for increased power on said radio downlink, means for incrementing in response to each frame out-of-sync signal, a counter of possible frame out-of-sync signals, for providing a count signal indicative of a number of frames possibly out-of-synchronization, and means for comparing said count signal to a count threshold for providing said uplink shutdown signal in the presence of said count signal equaling or exceeding said count threshold regardless of the presence or absence of said BCCH health signal.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
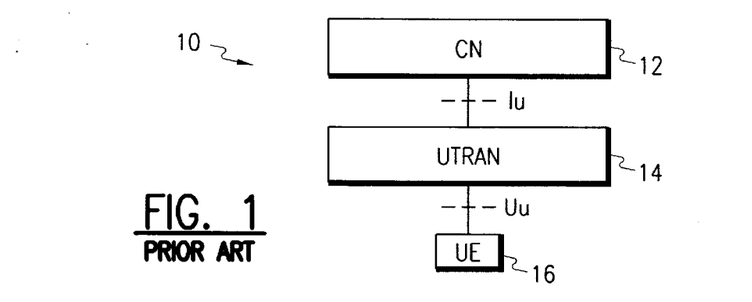
FIG. 1 shows from the prior art a simplified UMTS architecture.

FIG. 1 shows a simplified Universal Mobile Telecommunication System (UMTS) 10, including a Core Network (CN) 12, a UMTS Terrestrial Radio Access Network (UTRAN) 14, and a User Equipment (UE) 16. The CN 12 is connected to the UTRAN 14 by an Iu interconnection point, which is also considered a reference point. The UTRAN 14 is connected to the UE 16 by a Uu interconnection point, which is likewise considered as a reference point. The protocols over Uu and Iu interfaces are divided into two structures, i.e., user plane and control plane protocols. User plane protocols implement the actual radio access bearer servers for carrying user data through the access stratum. Control plane protocols control the radio access bearers and the connection between the UE and the network from different aspects (including requesting a service, controlling different transmission resources, handover and streamlining, etc.).

Figure 2:
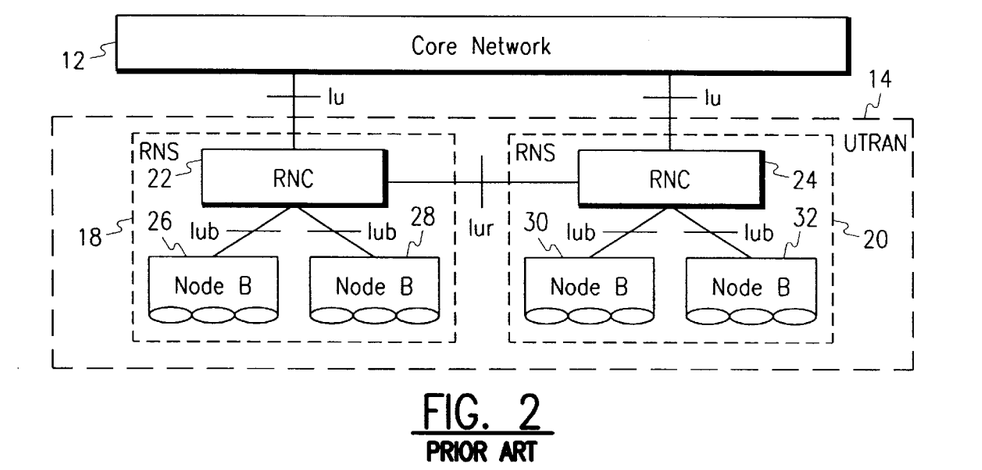
FIG. 2 shows from the prior art a simplified UTRAN architecture.

As shown in FIG. 2, the UTRAN consists of a set of Radio Network Subsystems (RNSS) 18, 20 connected to the core network 12 through the Iu. A RNS consists of a Radio Network Controller (RNC) 22, 24 and one or more abstract entities currently called Node B 26, 28, 30, 32. The node Bs are connected to the RNC through the Iub interface.

Figure 3:
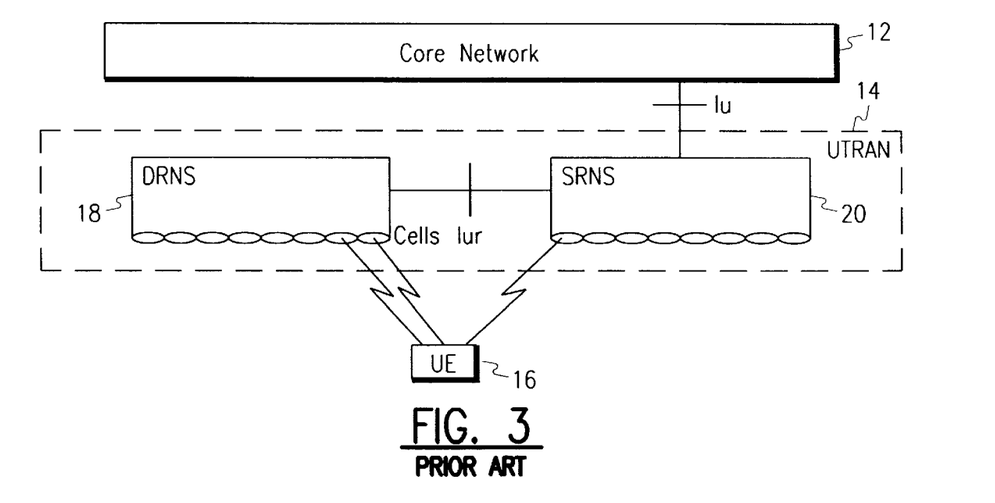
FIG. 3 shows from the prior art serving and drift RNSs.

A Node B can support frequency division duplexing (FDD) mode, time division duplexing (TDD) mode or dual-mode operation. The RNC is responsible for the handover decisions that require signaling to the UE. It comprises a combining/splitting function to support macrodiversity between different Node Bs. Inside the UTRAN, the RNCs of the radio network subsystems can be interconnected together through an Iur interface. At the bottom of each Node B in FIG. 2 are shown a plurality of cells, for which each corresponding Node B is responsible. For each connection between a user equipment and the UTRAN, one RNS is the serving RNS. When required, drift RNSs support the serving RNS by providing radio resources, as shown in FIG. 3. The rollover RNS (serving or drift) is on a per connection basis between a UE and the UTRAN, as also shown in FIG. 3.

Among the synchronization issues relating to the UTRAN are the radio interface synchronization, which relates to the timing of the radio frame transmission (either in the downlink for FDD or in both directions for TDD). FDD and TDD have different mechanisms to determine the exact timing of the radio frame transmission and also different requirements on the accuracy of this timing. In FDD, radio interface synchronization is necessary to assure that the UE receives radio frames synchronously from different cells, in order to minimize UE buffers. In TDD, radio interface synchronization is necessary to synchronize radio frames within neighboring cells (radio frame synchronization) in order to minimize cell cross-interference and between UE and UTRAN (timing advance) in order to minimize UE-cell interference. For reasons given below, the present invention is practically limited to the TDD mode.

As mentioned above, there is no procedure defined for UMTS on how the UE is supposed to handle an out-of-synchronization condition when it occurs. The TDD mode, which is TDMA, is prone to timeslot interference, and the occurrence of high interference in a timeslot can be interpreted as an out-of-synchronization condition, when that is in fact not the case. In the case of data reception of poor quality, it is difficult to distinguish whether it is due to the interference or loss of synchronization.

On the other hand, for the case when nothing is received, it is quite straightforward to simply decide to terminate the link. But where the possible out-of-synchronization condition is really due to timeslot interference, it would be desirable to take a little more time and effort to find out if it is, in fact, interference and not an out-of-synchronization condition. But, one would not want to engage in such extra effort if it is already known in the UTRAN that the environment is such that interference is not likely. Hence, two cases can be considered and threshold parameters set specifying the number of frames over which the UE is allowed to continue transmission specified. The uplink total power command (TPC) would be independent of the case and set to 1 (power-up command). It would be up to the UTRAN then to decide when power has exceeded a specified threshold and the connection is dropped.

Referring back to FIG. 1, it should be realized that the UTRAN and the UE together perform measurements on radio channels (current and surrounding cells) and translate these measurements into radio channel quality estimates. Thus, the radio environment is surveyed by various measurements which may include received signal strengths, estimated bit error ratios, estimation of propagation environments, transmission range, doppler shift, synchronization status, received interference level, total downlink transmission power per cell, etc. In order for these measurements and the subsequent analysis to be meaningful, some association between the measurements and the channels to which they relate should be made in the analysis. Such association may include the use of identifiers for the network, the best base station, the cell (base station sector) and/or the radio channel. These functions are located in the UE and in the UTRAN.

If, according to the present invention, as a result of such analysis it is determined that the received interference level is not of such a high degree that it would normally be causing any out-of-synchronization condition in the UEs, a "case 1" should be declared to be used for a particular cell, as determined in the UTRAN. In this case, the above-mentioned extra time and effort needed to determine a possible case of interference on a given channel in which a possible out-of-synchronization condition exists would not be entertained, as decided in the UTRAN.

Figure 4:
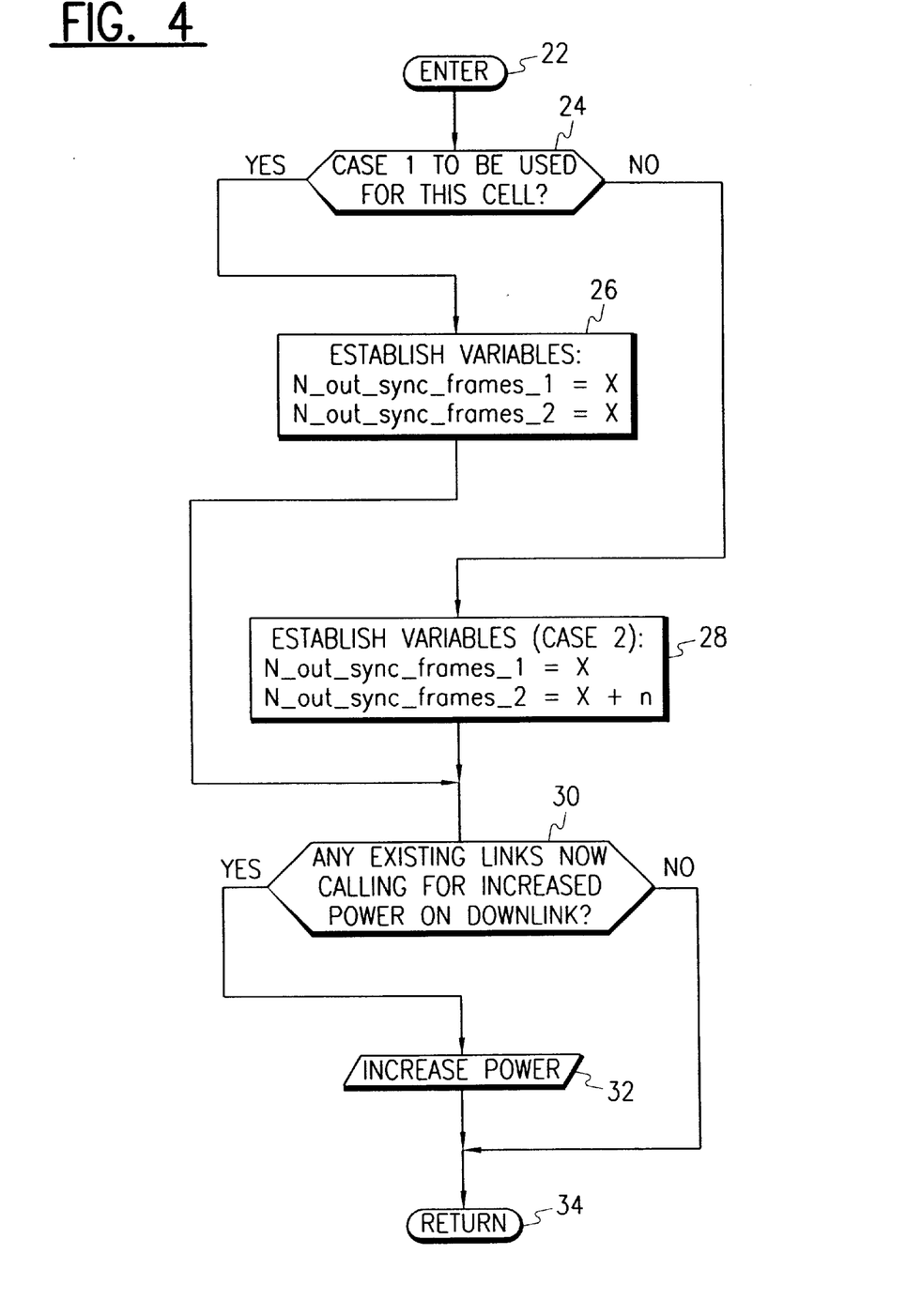
FIG. 4 shows a routine which may be carried out in the UTRAN, according to the present invention.

For instance, FIG. 4 shows a methodology to be carried out in the UTRAN 14 for establishing variables to be used in a cell depending on the environment. After entering in a step 22, a step 24 is executed to determine whether case 1 is to be used for this particular cell or not. If so, it must be the case that the UTRAN knows that from the radio environment survey that out-of-synchronization conditions cannot or are not likely to result from any inter-system interference or MS-to-MS interference. In that case, as shown in a step 26, a pair of variables are established to be equal to the same selected "X" value and, as explained more fully below, the "out-of-sync" criteria is based on the dedicated channel only.

If the case 1 is not to be used for this cell, the variables are set differently, as shown in a step 28, and then the MS can try to compensate for the out-of-synchronization condition for a longer period of time with extra effort, if the common channel reception level suggests that the link budget should be alright. It does this by establishing the second variable with a value of "X+n", which will be explained below in connection with FIG. 6.

In any event, once the variables are established, depending on the case, such variables can be communicated to the UEs on the downlink in one of the control channels.

Subsequently, as suggested by steps 30, 32, the UTRAN monitors for any existing links calling for increased power on the downlink. If such are detected, power is increased. If not, a return can be made or the steps 30, 32 can be repeated endlessly or stopped for some other reason.

Figure 5:
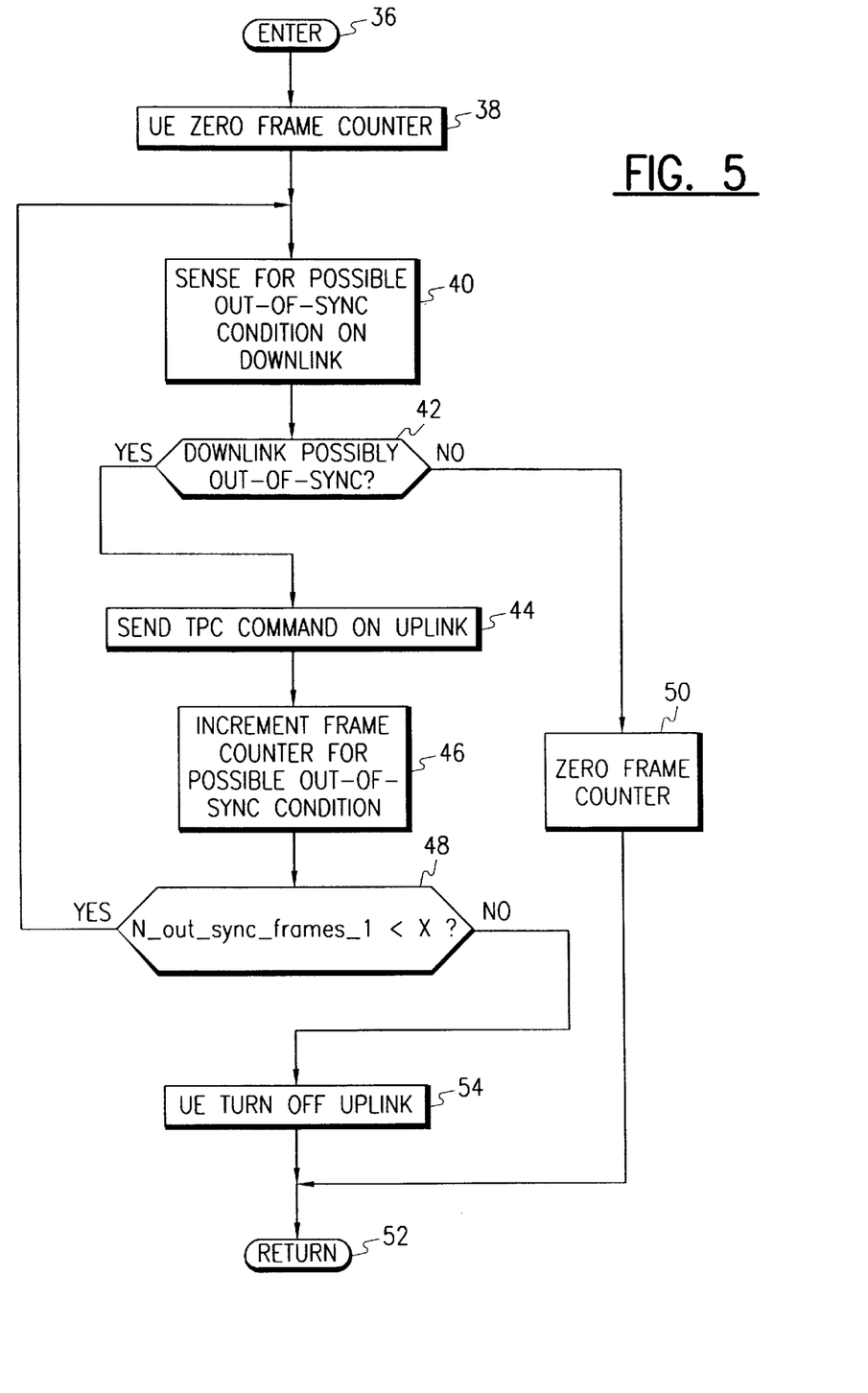
FIG. 5 shows the first of two cases which can be carried out in the user equipment, according to the case 1 scenario selected by the UTRAN in FIG. 1.
Figure 6:
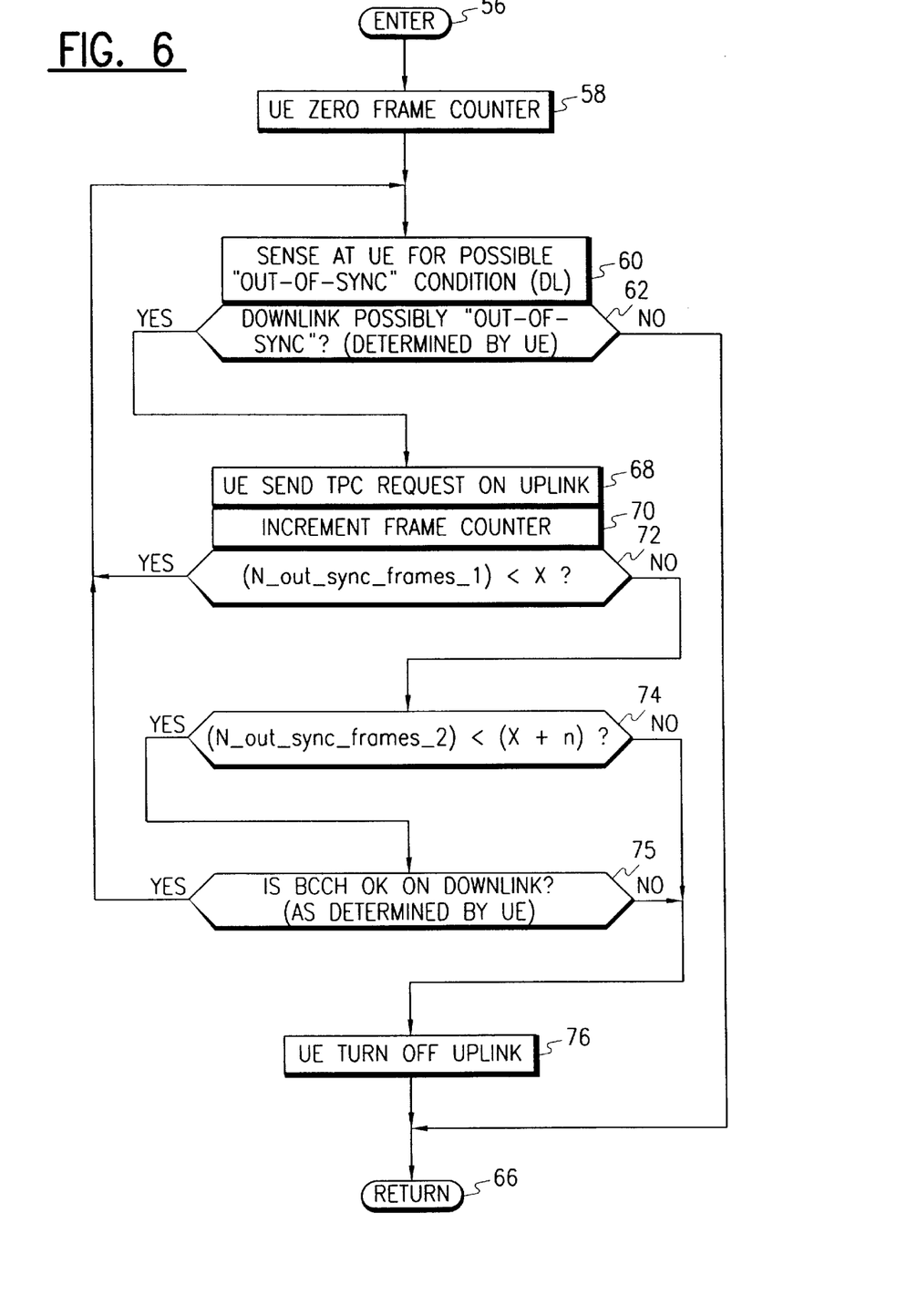
FIG. 6 shows a series of steps which may be carried out in the UE according to a case 2 selected by the UTRAN of FIG. 1.

FIG. 5 shows the corresponding methodology that can be taking place in the UEs for case 1, while FIG. 6 shows a similar methodology, except for case 2. Referring to FIG. 5, after entering in a step 36, the UE zeroes a frame counter that may be used to count frames detected in a possible out-of-sync condition. A step 40 is then executed to sense for a possible out-of-sync condition on the downlink channel of interest. If a possible out-of-sync condition has been detected on the downlink, as determined in a step 42, a TPC command is sent on the uplink to the UTRAN, as indicated in a step 44, requesting increased power on the downlink. The frame counter is then incremented for that frame for a possible out-of-sync condition. The count of the frame counter is then compared to the variable value (X) set by the UTRAN 14 in FIG. 1 for case 1. If the variable is less than the set value (X), the steps 40–48 are repeated until either X is exceeded or the downlink is determined to be not in the out-of-sync condition. In the latter case, the frame counter can be zeroed, as indicated in a step 50, and a return made in a step 52. If, on the other hand, the frame counter counts up to a value that equals X the UE turns off the uplink, as indicated in a step 54, before making a return in the step 52. In the foregoing situation described in FIG. 5 for case 1, the UTRAN had previously determined that the radio environment was such that it was unlikely that there would be any out-of-sync condition caused by a received interference level on the dedicated downlink channel. Consequently, there was only a need to check the first variable against the frame counter and there was no need to check against the second variable, since the first and second variables are set to the same value.

Referring now to FIG. 6, the second case for the UE is illustrated. After entering in a step 56, the UE zeroes a frame counter used to keep track of the number of frames occurring during a possible out-of-sync condition, as indicated in a step 58. A step 60 is then executed to cause the UE to sense for a possible out-of-sync condition on the dedicated downlink channel of interest. A determination is then made in a step 62 as to whether the downlink channel of interest is possibly "out of sync". If not, the UE returns in a step 66. On the other hand, if it is possible that an out-of-sync condition exists on the downlink channel of interest, the UE sends a TPC command on the uplink to the UTRAN, as indicated in a step 68. The frame counter is then incremented at the UE as indicated in a step 70 and compared in a step 72 to the value of the first variable "X". If the count of the frame counter is less than X, then the steps 60 et seq. are repeated again until either the frame counter equals X or the possibility of an out-of-sync condition is determined in the negative.

Assuming the count of the frame counter eventually reaches the value of X, then a step 74 is executed in order to allow the repetitions of the above-mentioned steps to repeat for a longer period of time, provided the broadcast channel is not subject ot interference, so as to permit the TPC command to continue to request ever-increasing levels of power from the UTRAN on the downlink. A determination is made in a step 75 as to the quality of the broadcast channel. In this way, the increased power may eventually overcome any interference in the channel that is making reception difficult in a case where synchronization nevertheless exists. Thus, the value of the second variable is set equal to "X+n", and the steps 60 et seq. are repeated again and again (provided the BCCH is alright) until the count of the frame counter equals the variable "X+n", or the increased power overcomes the poor reception problem and the step 62 causes an exit from the inner loop to zero the frame counter 64 and return in the step 66. On the other hand, even with the extended period of increasing power on the downlink, eventually the frame counter may equal the variable "X+n", and a step 76 is executed to turn off the uplink and return as before. Similarly, at any time during this longer period of time the BCCH may not be alright and the uplink immediately terminated.

Figure 7:
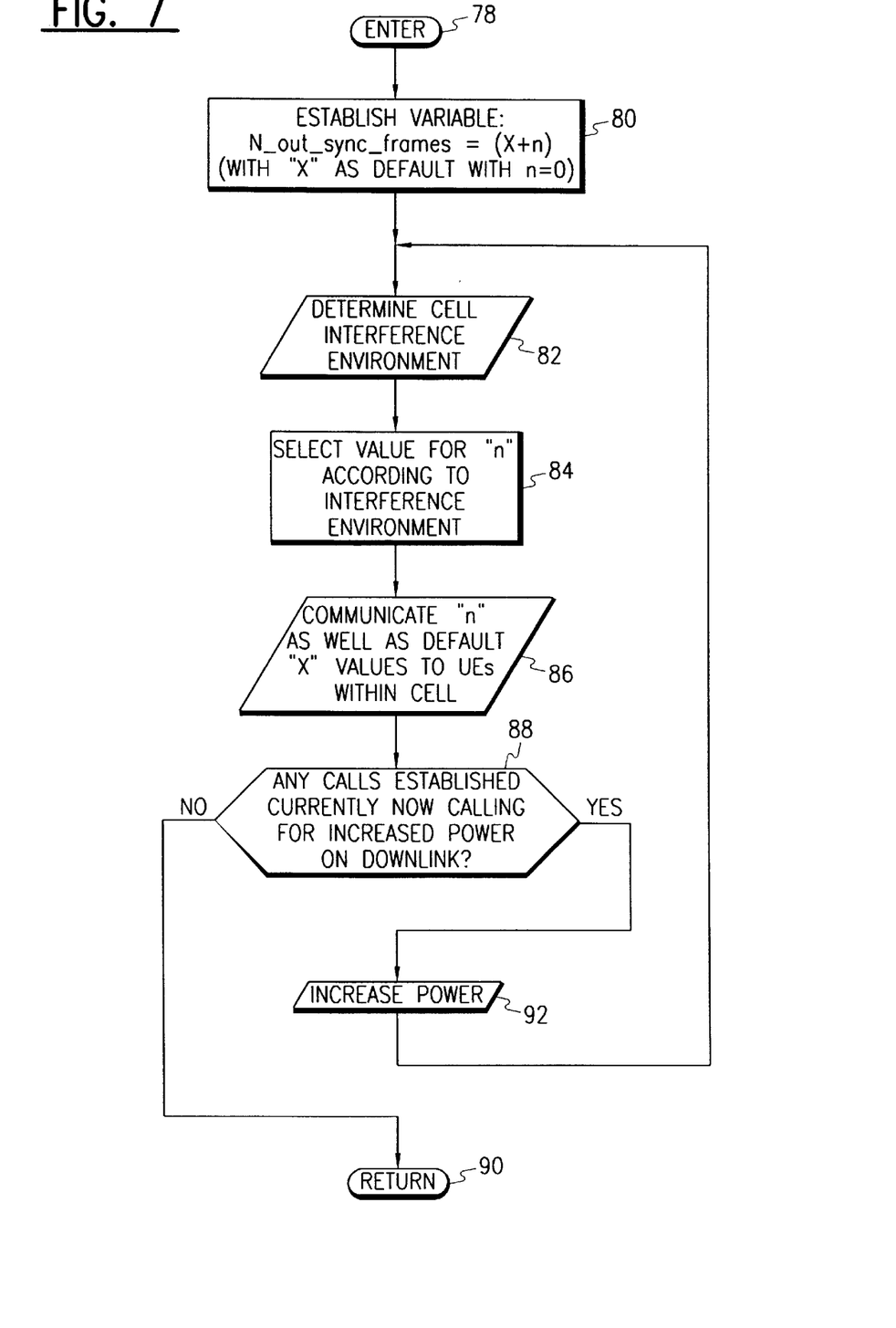
FIG. 7 shows a routine which may be carried out in the UTRAN, according to a second embodiment of the invention.
Figure 8:
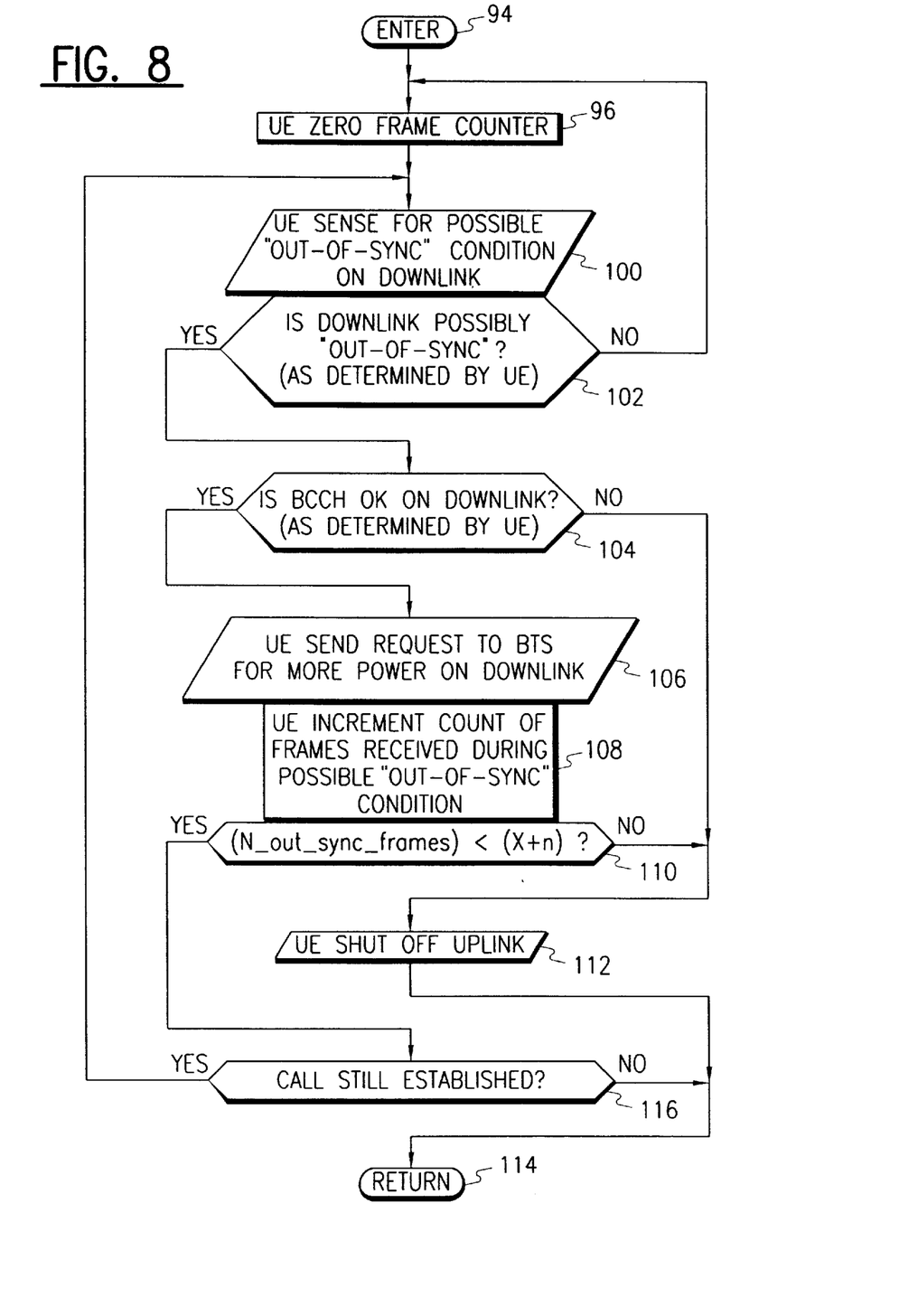
FIG. 8 shows a routine which may be carried out in a user equipment, according to the second embodiment of the present invention.

It should be realized that there are many ways to attack this problem, according to the invention, and it is not necessarily required to set up two variables or to check BCCH only during the longer period of time, as shown above. For instance, as shown in FIGS. 7 and 8, an alternative embodiment could establish only a single variable, as explained below. Referring first to FIG. 7, which is carried out in the UTRAN, after entering in a step 78, a variable is established and a value set to "X+n", with "X" being the default, with "n=0" for case 1. For case 2, the n has some finite value given. As shown in the step 82, the cell interference environment is determined before selecting the value for "n" in a step 84. In a step 86, the value of "n" as well as the default "X" value is communicated to the UEs within the cell, as well as optionally nearby UEs within adjacent cells. A step 88 is then executed to determine if there are any calls established between the UTRAN and UEs currently now calling (TPC on the uplink) for increased power on the downlink. If not, a return is made in a step 90. If so, power is increased as indicated in a step 92 before re-executing the steps 82 et seq.

Referring now to FIG. 8, a UE will enter at a step 94 and then in a step 96 will zero a frame counter that keeps track of the number of frames in which a possible "out-of-sync" condition exists. After zeroing the frame counter, a step 100 is executed in which the UE senses for a possible "out-of-sync" condition on a dedicated channel on the downlink with which it is having difficulty, either due to interference or an out-of-sync condition. A step 102 is then executed to determine if a possible "out-of-sync" condition exists. If not, the steps 96, 100, 102 are re-executed. Or, instead of re-executing steps 96, 100, 102, a return could be made. If the step 102 determines that a possible "out-of-sync" condition exists on a dedicated channel of the downlink, a step 104 is executed to check the broadcast common channel (BCCH) for interference level. If the BCCH is satisfactory on the downlink, then there is a distinct possibility that there is no synchronization problem and the interference problem might be solvable by increasing the power on the downlink. A step 106 is therefore executed in which the UE sends a request to the BTS for more power on the downlink. The UE then increments the count of the frame counter, as indicated in a step 108. The count of the frame counter is then compared in a step 110 to the value (X+n) of the variable established by the UTRAN. If not, the UE shuts off the uplink, as indicated in a step 112, and a return is made in a step 114. On the other hand, if the count of the frame counter is still less than X+n, a step 116 is executed to determine if the call is still established and, if so, the step 100 is then executed again, followed by the step 102. Assuming the out-of-sync condition still exists, the broadcast channel is checked again and, assuming more power is requested again in the step 106, the frame count is increased in the step 108 and compared again to the value X+n of the variable "N_out_sync_frames".

The steadily increasing power may eventually cause the possible "out-of-sync" condition to no longer exist, and the step 102 will then cause the loop to be exited either by zeroing the frame counter in the step 96 or returning (as an alternative to the illustrated methodology). Or, the frame counter will eventually equal the value X+n, in effect concluding that there is, in fact, an out-of-sync condition, since increased power did not solve the problem.

Figure 9:
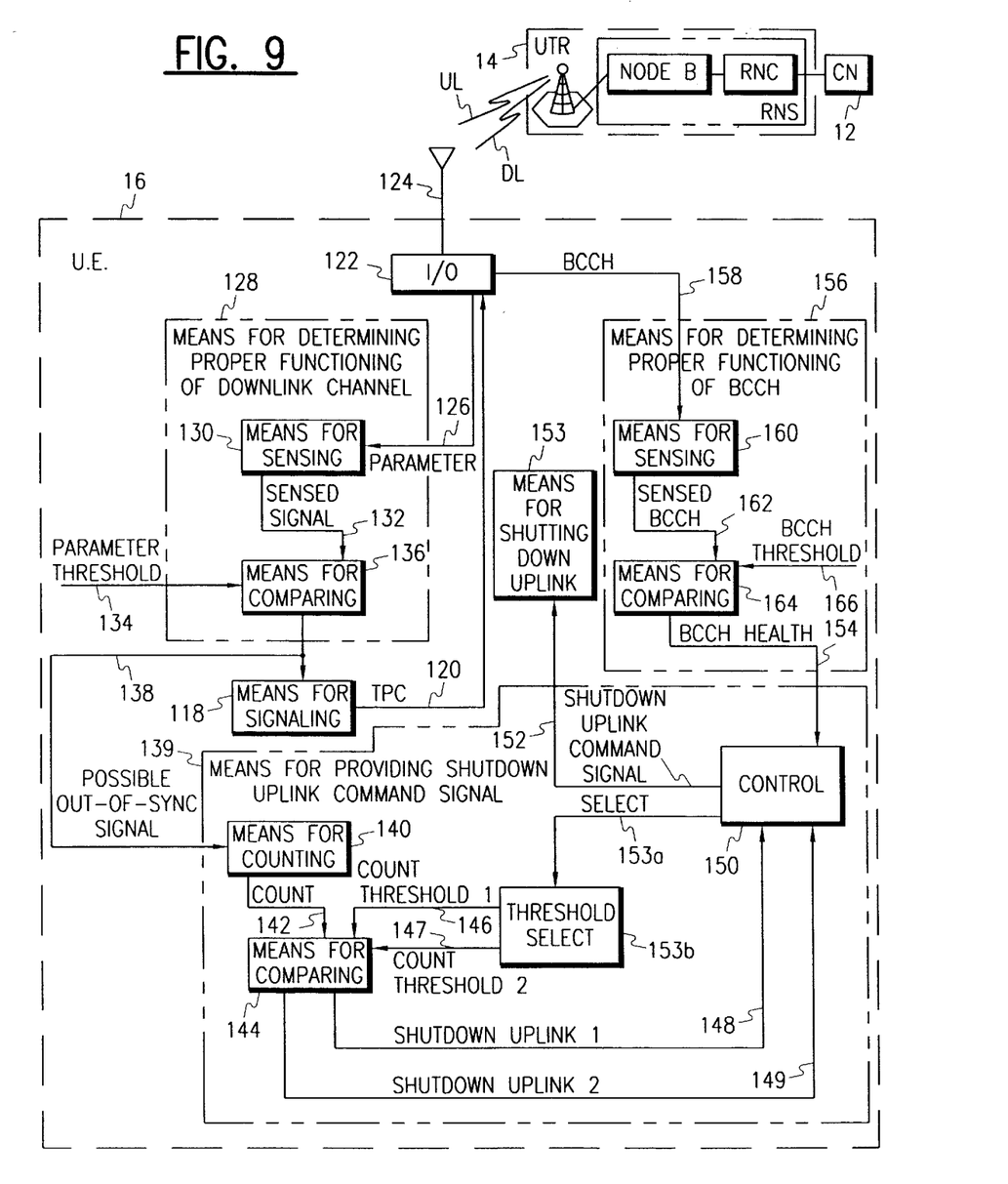
FIG. 9 shows a user equipment, according to the present invention.

FIG. 9 shows a user equipment 16 communicating with UTRAN 14 over an uplink UL and a downlink DL. The downlink may include a dedicated channel which may be experiencing a possible out-of-synchronization condition or merely interference. It may be difficult to distinguish the two conditions without further information or without taking further steps.

The UE 16 may include means 118 that is, for instance, continually sending power control signaling on a line 120 to an input/output (I/O) means 122, which in turn provides the power control signals to an antenna 124 which communicates the power control signals over the radio uplink to the UTRAN 14. This power control signaling feature can be used for purposes other than the invention and so is in continual communication with the UTRAN. Nonetheless, it can also be implemented as a means for signaling commands on a case-by-case basis. In any event, the UE 16 may include the means 118 embodied for sending power control commands, e.g., by signaling the UTRAN 14 over the uplink that more power is required using a Total Power Control (TPC) signal on the line 120. This TPC signal can be provided to the I/O means 122, which in turn provides the TPC signal to the antenna 124 which communicates the TPC signal over the radio uplink to the UTRAN 14. The antenna 124 also receives the dedicated channel on the downlink (DL) from the UTRAN 14 and provides it to the I/O means 122, which in turn provides a parameter signal on a line 126 to means 128 for determining proper functioning of a downlink channel. The means 128 may include means 130 for sensing the parameter signal 126 and for providing a sensed signal on a line 132 having a magnitude indicative of the level of interference in the dedicated channel on the downlink. The sensed signal on the line 132 is compared to the magnitude of a parameter threshold signal on a line 134 in a means 136 for comparing the two signals. If the magnitude of the sensed signal on the line 132 exceeds that of the selected parameter threshold level on the line 134, the means for comparing 136 provides a possible out-of-sync signal on a line 138 to the means 118 for sending power control commands to signal, e.g., TPC, discussed previously. In response to the signal on the line 138, the means 118 for sending power control commands provides the TPC signal through the I/O means 122 for transmission on the uplink to the UTRAN 14. It should be realized that the increased power mechanism may not be present or may be carried out in the UTRAN.

Regardless of how or even whether the means 118 is utilized in a given embodiment, the signal on the line 138 is also provided to a means 139 for providing a shutdown uplink command signal. The means 139 includes a means 140 for counting the number of possible out-of-sync signal frames, as indicated by the signal on the line 138. The means 140 provides a count signal on a line 142 to a means 144 for comparing the count signal to a first selected count threshold signal on a line 146 or to a second selected count threshold signal on a line 147. If the count exceeds the selected count threshold, a shutdown uplink signal is provided on a line 148 or on a line 149 to control means 150 for providing a shutdown uplink command signal on a line 152 to means 153 for shutting down radio transmission on the uplink. In response to the shutdown uplink command signal on the line 152, the means 153 for shutting down the uplink will take an appropriate action within the UE to cause the uplink to be terminated.

According to the invention, the control means 150 provides a select signal on a line 153a to a threshold select device 153b which provides either the first count threshold signal on the line 146 or the second count threshold signal on the line 147. The select signal on the line 153a selects one or the other of the threshold signals 146, 147, depending on the select signal on the line 153a which in turn depends on the health signal on the line 154. As explained previously, it may be desirable to delay shutting down the uplink because a possible out-of-synchronization indication may be erroneous and the actual condition may merely be a high level of interference in the dedicated downlink channel. Such may be solved by further increasing the output power from the UTRAN on the downlink in response to continued TPC or other power control command requests on the line 120. In response to continued power control commands, e.g., TPC, the UTRAN steadily increases power output. Thus, in order to gain a little more time, if justified, it can be determined whether a common downlink channel is experiencing interference or not. If not, the first threshold as indicated on the line 146 is used, and the shutdown uplink command sent forthwith upon reaching that threshold. However, if the common channel is also experiencing interference, the control means 150 provides the select signal on the line 153a in such a way as to cause the threshold select device 153b to provide the second count threshold signal on the line 147 to the means 144 for comparison with the count signal on the line 142. In that event, a little more time is gained, and instead of sending the shutdown signal forthwith on the line 148, the count threshold is increased by a selected amount, and the shutdown uplink signal on the line 149 is not sent until a little while longer in order to allow increased power from the UTRAN to overcome the possible out-of-sync condition.

One way to provide the common channel signal is to provide the BCCH channel on a line 158 to the means 156 for determining proper functioning of BCCH, i.e., for determining whether it is experiencing a high degree of interference or not. A means 160 can be provided for sensing the interference in the BCCH signal on the line 158 and providing a sensed BCCH signal on a line 162 indicative thereof. The sensed BCCH signal on the line 162 can be provided to a means 164 for comparing the sensed BCCH signal to a BCCH threshold signal on a line 166. This threshold signal is selected to represent a level of interference in the BCCH signal which would indicate a level of interference on other channels on the downlink that might cause a possible out-of-sync condition to be indicated. If the sensed BCCH signal on the line 162 exceeds the BCCH threshold signal on the line 166, the BCCH health signal on the line 154 will be provided to the control means 150 at a level that would cause the control means 150 to delay the shutdown uplink command signal on the line 152 by causing the second count threshold signal on the line 149 to be asserted. If the BCCH health signal on the line 154 is such that the shutdown uplink demand can be delayed, the threshold select signal on the line 153a signals the threshold select device 153b to provide the second count threshold signal on the line 147 which is at a higher value than the first count threshold signal on the line 146. In other words, in keeping with the earlier description above, the first count threshold on the line 146 would correspond to the variable value "X", and the value of the second count threshold variable for the signal on the line 172 would be "X+n". In the latter event, the count signal on the line 142 can increase to a higher value before reaching the threshold and triggering the means 144 to provide a second shutdown uplink command signal on the line 149 to the control means 150 for providing the shutdown uplink command signal on the line 152 to the means 153 for shutting down the downlink. In regard to the control function performed by the control means 150 with respect to the first and second shutdown uplink signals on the lines 148, 149, it is nothing more than an OR function whereby the signals on the lines 148, 149 are inputs to an OR gate, while the signal on the line 152 is an output of the OR gate.

It should be realized that the UE 16 can be organized in many different ways to carry out the object of the present invention. For instance, although the disclosure in FIG. 9 shows the UE requesting increased power on the uplink using the TPC signal, that is not an essential part of the invention, as there can be other ways of increasing the power besides having the UE signal the UTRAN. As mentioned above, the means for power control signaling 118 can be a means that is continually in communication with the UTRAN for purposes of communicating power control signals. In that event, the signal on the line 138 from the means 136 for comparing will simply trigger a change in the stream of power control signals on the line 120. It should also be realized that although the above description describes the monitoring of the BCCH, any of the common channels that provide the beacon functionality could be measured.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use by user equipment (UE) in a mobile telecommunications system, comprising the steps of:

sending power control commands on an uplink from a UE to a base station transceiver (BST) for controlling power on a downlink channel experiencing a possible frames out-of-synchronization condition which may instead be a possible interference condition so as to attempt to eliminate said possible interference condition by increased power, and terminating said uplink after a first selected period of time without eliminating said possible interference problem unless a broadcast downlink channel is determined to be experiencing interference below a selected level in which case said UE continues to send said power control commands until after a second selected period of time without eliminating said possible interference problem after which said uplink is terminated.

2. Method for use by user equipment (UE) in a mobile telecommunications system, comprising the steps of:

sensing in each UE a parameter having a magnitude indicative of a possible out-of-synchronization condition of each frame of a radio downlink channel from a base station transceiver to the UE, for providing a sensed signal have a magnitude indicative thereof, comparing said sensed signal to a threshold for providing a possible frame out-of-sync signal for each frame for which said sensed signal exceeds said threshold, sending on a radio uplink from the mobile station to the BST, in response to said frame out-of-sync signal, a power control command for increased power on said radio downlink, incrementing, in response to each frame out-of-sync signal, a counter of possible frame out-of-sync signals, for providing a count signal indicative of a number of frames possibly out-of-synchronization, and comparing said count signal to a count threshold for providing a shutdown uplink signal in the presence of said count signal equalling or exceeding said count threshold.

3. The method of claim 2, further comprising the steps of:

delaying said providing said shutdown uplink signal in the presence of a downlink broadcast channel that is functioning with interference at an acceptable level and continuing said sending said power control command on said radio uplink from the UE to the BST for increased power on said radio downlink, said incrementing said counter, and said comparing said count signal but now to a selected increased count threshold for providing said shutdown uplink signal in the presence of said count signal equalling or exceeding said selected increased count threshold.

4. Method for use in a mobile telecommunications system having plural cells, each cell having a base station transceiver (BST) for communicating over multiple radio links at the same time with corresponding multiple mobile stations (UEs) in the cell and over additional radio links with corresponding additional UEs nearby but in other cells, comprising the steps of:

sensing in each UE a parameter having a magnitude indicative of a possible out-of-synchronization condition of each frame of a radio downlink channel from the BST to the UE, for providing a sensed signal having a magnitude indicative thereof, comparing said sensed signal to a threshold, for providing a possible frame out-of-sync signal for each frame for which said sensed signal exceeds said threshold, determining if a downlink broadcast channel is functioning properly for providing a broadcast channel (BCCH) health signal, providing a shutdown uplink signal in the absence of said BCCH health signal and otherwise, sending on a radio uplink from the UE to the BST, in response to both said BCCH health signal and said frame out-of-sync signal, a power control command for increased power on said radio downlink, incrementing in response to each frame out-of-sync signal, a counter of possible frame out-of-sync signals, for providing a count signal indicative of a number of frames possibly out-of-synchronization, and comparing said count signal to a count threshold for providing said shutdown uplink signal in the presence of said count signal equalling or exceeding said count threshold regardless of the presence or absence of said BCCH health signal.

5. User equipment (UE) for use in a mobile telecommunications system, comprising:

means for sending a power control command (TPC) on an uplink (UL) from said UE to a base station transceiver (BST) for increased power on a downlink (DL) channel experiencing a possible frames out-of-synchronization condition which may instead be a possible interference condition so as to attempt to eliminate said possible interference condition by increased power, and means for terminating said uplink after a first selected period of time without eliminating said possible interference problem unless a broadcast downlink channel is determined to be experiencing interference below a selected level in which case said UE continues to send said power control command until after a second selected period of time without eliminating said possible interference problem after which said uplink is terminated.

6. User equipment (UE) for use in a mobile telecommunications system, comprising:

means for sensing in each UE a parameter having a magnitude indicative of a possible out-of-synchronization condition of each frame of a radio downlink channel from a base station transceiver (BST) to the UE, for providing a sensed signal have a magnitude indicative thereof, means for comparing said sensed signal to a threshold for providing a possible frame out-of-sync signal for each frame for which said sensed signal exceeds said threshold, means for sending on a radio uplink from the UE to the BST, in response to said frame out-of-sync signal, a power control command (TPC) for increased power on said radio downlink, means for providing, in response to each possible frame out-of-sync signal, a count signal indicative of a number of frames possibly out-of-synchronization, and means for comparing said count signal to a count threshold for providing a shutdown uplink signal in the presence of said count signal equaling or exceeding said count threshold.

7. The UE of claim 6, further comprising:

means for delaying said providing said shutdown uplink signal in the presence of a downlink broadcast channel that is functioning with interference at an acceptable level whereby said sending a power control command on said radio uplink from the UE to the BST for increased power on said radio downlink is continued for a selected period.

8. Apparatus for use in a mobile telecommunications system having plural cells, each cell having a base station transceiver (BST) for communicating over multiple radio links at the same time with corresponding multiple mobile stations (UEs) in the cell and over additional radio links with corresponding additional UEs nearby but in other cells, comprising:

means for sensing in each UE a parameter having a magnitude indicative of a possible out-of-synchronization condition of each frame of a radio downlink channel from the BST to the UE, for providing a sensed signal having a magnitude indicative thereof, means for comparing said sensed signal to a threshold, for providing a possible frame out-of-sync signal for each frame for which said sensed signal exceeds said threshold, means for determining if a downlink broadcast channel is functioning properly for providing a broadcast channel (BCCH) health signal, means for providing a shutdown uplink signal to said BTS from said UE in the absence of said BCCH health signal, means for sending on a radio uplink from the UE to the BST, in response to both said BCCH health signal and said frame out-of-sync signal, a power command signal for increased power on said radio downlink, means for incrementing in response to each frame out-of-sync signal, a counter of possible frame out-of-sync signals, for providing a count signal indicative of a number of frames possibly out-of-synchronization, and means for comparing said count signal to a count threshold for providing said shutdown uplink signal in the presence of said count signal equaling or exceeding said count threshold regardless of the presence or absence of said BCCH health signal.

9. Method for use by user equipment (UE) in a mobile telecommunications system, comprising the steps of:

providing, in response to a parameter signal (126) received by said UE over a downlink from a base station transceiver (BST), a signal (138) indicative of a possible improper functioning of a downlink channel;

providing, in response to a common channel downlink signal (158) having a magnitude indicative of proper functioning thereof, a common channel downlink health signal (154); and providing, in response to said signal (138) indicative of possible improper functioning of a downlink channel and said common channel health signal (154), a shutdown uplink command signal (152).

10. The method of claim 9, further comprising the step of providing, in response to said signal (138) indicative of possible improper functioning of said downlink channel, an uplink power command signal (120) from the UE to the BST for increased power on said downlink channel.

11. The method of claim 9, wherein said step of providing a signal (138) indicative of possible improper functioning of a downlink channel comprises the steps of:

sensing said parameter signal (126) having a magnitude indicative of said possible improper functioning of a downlink channel, for providing a sensed signal (132) having a magnitude indicative thereof, and comparing said magnitude of said sensed signal (132) to a parameter threshold signal (134) having a magnitude indicative of a selected threshold, for providing said signal (138) indicative of possible improper functioning of a downlink channel.

12. The method of claim 9, wherein said step of providing said health signal (154) comprises the steps of:

sensing said common channel downlink signal (158) for providing a sensed common channel downlink signal (162), and comparing said sensed common channel downlink signal (162) to a threshold signal (166) for providing said common channel health signal (154).

13. The method of claim 9, wherein said step of providing a shutdown uplink command signal (152) comprises the steps of:

counting instances of said signal (138) indicative of possible improper functioning of a downlink channel for providing a count signal (142), comparing said count signal (142) to a count threshold signal (146, 147) for providing said shutdown uplink command signal (152) in the presence of said count signal exceeding said count threshold signal.

14. The method of claim 13, further comprising the step of selecting said count threshold signal (146, 147) in response to said common channel health signal (154).

15. Method for use by user equipment (UE) in a mobile telecommunications system, comprising the steps of:

providing, in response to a parameter signal (126) received by said UE over a downlink from a base station transceiver (BST), a signal (138) indicative of a possible improper functioning of a downlink channel;

providing, in response to a common channel downlink signal (158) having a magnitude indicative of proper or improper functioning thereof, a common channel downlink health signal (154); and providing, in response to said signal (138) indicative of possible improper functioning of a downlink channel and said common channel health signal (154), a shutdown uplink signal (152) to said BST.

16. The method of claim 15, further comprising the step of providing, in response to said signal (138) indicative of possible improper functioning of said downlink channel, an uplink power control command signal (120) from the UE to the BST for increased power on said downlink channel.

17. The method of claim 15, wherein said step of providing a signal (138) indicative of possible improper functioning of a downlink channel comprises the steps of:

sensing said parameter signal (126) having a magnitude indicative of said possible improper functioning of a downlink channel, for providing a sensed signal (132) having a magnitude indicative thereof, and comparing said magnitude of said sensed signal (132) to a parameter threshold signal (134) having a magnitude indicative of a selected threshold, for providing said signal (138) indicative of possible improper functioning of a downlink channel.

18. The method of claim 15, wherein said step of providing said health signal (154) comprises the steps of:

sensing said common channel downlink signal (158) for providing a sensed common channel downlink signal (162), and comparing said sensed common channel downlink signal (162) to a threshold signal (166) for providing said common channel health signal (154).

19. The method of claim 15, wherein said step of providing a shutdown uplink command signal (152) comprises the steps of:

counting instances of said signal (138) indicative of possible improper functioning of a downlink channel for providing a count signal (142), comparing said count signal (142) to a count threshold signal (146, 147) for providing said shutdown uplink command signal (152) in the presence of said count signal exceeding said count threshold signal.

20. The method of claim 19, further comprising the step of selecting said count threshold signal (146, 147) in response to said common channel health signal (154).

21. User equipment (UE) for use in a mobile telecommunications system, comprising:
   means (128) for providing, in response to a parameter signal (126) received by said UE over a downlink from a base station transceiver (BST), a signal (138) indicative of a possible improper functioning of a downlink channel;
   means (156) for providing, in response to a common channel downlink signal (158) having a magnitude indicative of proper functioning thereof, a common channel downlink health signal (154); and
   means (139) for providing, in response to said signal (138) indicative of possible improper functioning of a downlink channel and in response to said common channel health signal (154), a shutdown uplink command signal (152).

22. The UE of claim 21, further comprising means (118) for providing, in response to said signal (138) indicative of possible improper functioning of said downlink channel, an uplink power command signal (120) from the UE to the BST for increased power on said downlink channel.

23. The UE of claim 21, wherein said means (128) for providing a signal (138) indicative of possible improper functioning of a downlink channel comprises:
   means (130) for sensing said parameter signal (126) having a magnitude indicative of said possible improper functioning of a downlink channel, for providing a sensed signal (132) having a magnitude indicative thereof, and
   means (136) for comparing said magnitude of said sensed signal (132) to a parameter threshold signal (134) having a magnitude indicative of a selected threshold, for providing said signal (138) indicative of possible improper functioning of a downlink channel.

24. The UE of claim 21, wherein said means (156) for providing said health signal (154) comprises:
   means (160) for sensing said common channel downlink signal (158) for providing a sensed common channel downlink signal (162), and
   means (164) for comparing said sensed common channel downlink signal (162) to a threshold signal (166) for providing said common channel health signal (154).

25. The UE of claim 21, wherein said means (139) for providing a shutdown uplink command signal (152) comprises:
   means (140) for counting instances of said signal (138) indicative of possible improper functioning of a downlink channel for providing a count signal (142),
   means (144) for comparing said count signal (142) to a count threshold signal (146, 147) for providing said shutdown uplink command signal (152) in the presence of said count signal exceeding said count threshold signal.

26. The UE of claim 25, further comprising means (150, 153b) for selecting said count threshold signal (146, 147) in response to said common channel health signal (154).

* * * * *